April 5, 1955

A. W. BULL ET AL 2,705,529

SAFETY DEVICE

Filed Aug. 7, 1952

INVENTOR.
ARTHUR W. BULL
RICHARD J. MATT
BY James J. Long
AGENT.

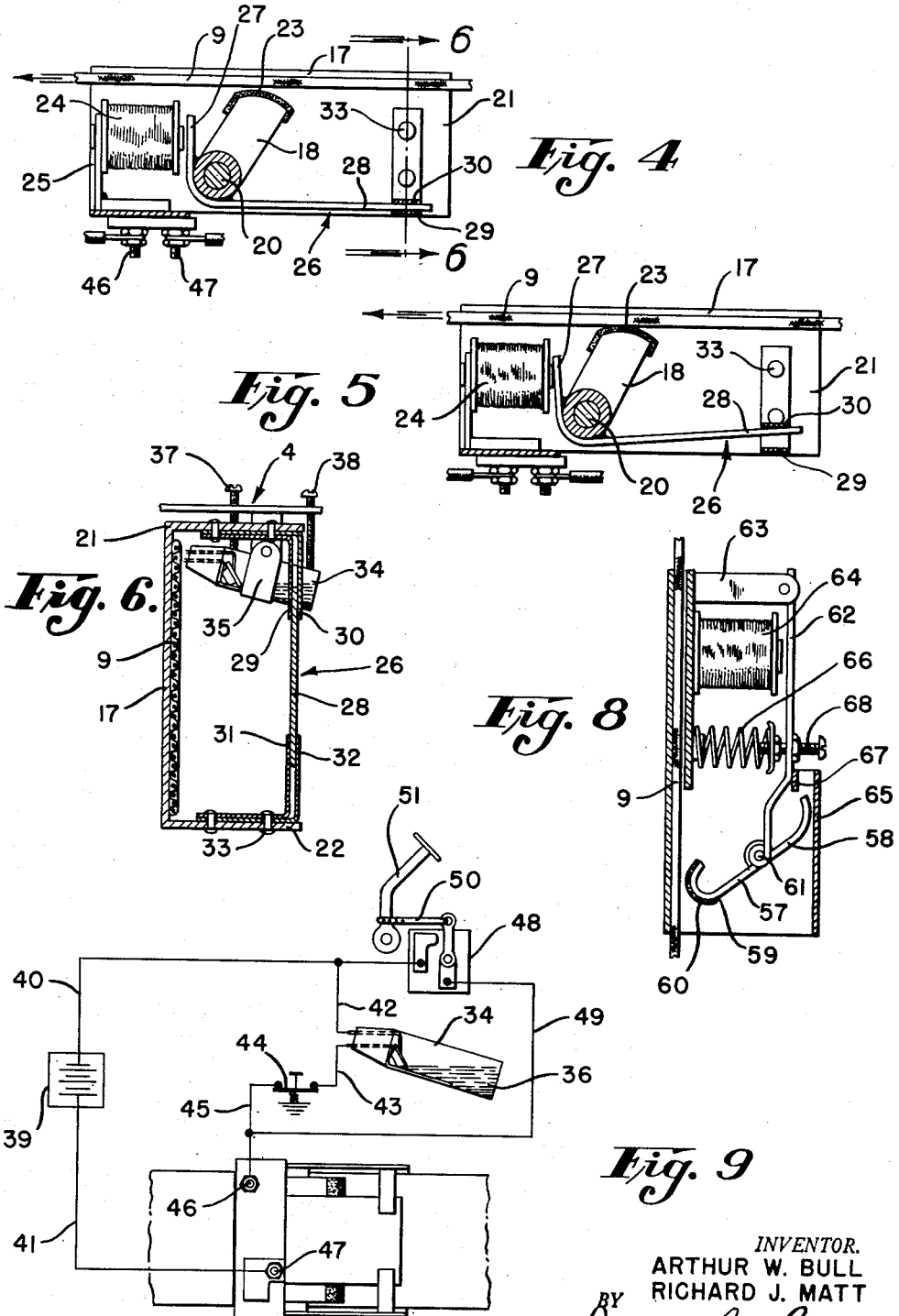

United States Patent Office 2,705,529
Patented Apr. 5, 1955

2,705,529
SAFETY DEVICE

Arthur W. Bull, Grosse Pointe, and Richard J. Matt, Detroit, Mich., assignors to United States Rubber Company, New York, N. Y., a corporation of New Jersey Application August 7, 1952, Serial No. 303,102

4 Claims. (Cl. 155—189)

Our invention concerns a safety device, for use in vehicles, designed to prevent passengers from being thrown forward upon rapid deceleration of the vehicle.

The injuries suffered by passengers in automobile collisions are frequently due to the fact that the inertia of the passenger in the rapidly moving vehicle causes the passenger to be thrown forward suddenly when the vehicle is rapidly decelerated. Thus, in a collision, the driver of an automobile may be projected violently against the steering wheel and windshield of the automobile, and may be seriously or even fatally injured, even though the automobile may in itself have more than sufficient structural strength to withstand the impact of the collision. The hazard is increased by the presence, about the front part of the interior of the vehicle, of projections such as sun visor brackets and rear view mirrors, and various control knobs on the dash board. Children riding in the front seat of the vehicle seem to be particularly susceptible to this type of injury, and they are endangered by any unusually sudden stops.

It has been proposed to prevent personal injury from this cause by providing safety belts or straps for the passengers, which could be detachably fastened to the seats of the vehicle, and passed around the body of the passenger, so as to restrain forward movement from the seat. Such devices have not met with favor because of the inconvenience and discomfort attendant upon remaining strapped into the seat of a vehicle in a relatively fixed attitude. The present invention aims to provide an improved safety restraint which exerts its restraining function only at the instant of the emergency, and leaves the occupants of the vehicle otherwise essentially free to lean forward or change their position at will, except in an emergency.

Various objects and advantages of the invention will be made manifest in the following detailed description, which is intended to be read with reference to the accompanying drawings, wherein:

Figs. 4 and 5 are fragmentary sectional plan views, taken along line 4—4 of Fig. 2, showing the arresting portion of the device in alternate operating positions;

Fig. 6 is a sectional elevational view of a portion of the device, taken along line 6—6 of Fig. 4;

Figs. 7 and 8 are enlarged sectional plan views of portions of modified forms of the device; and, Fig. 9 is an elementary electrical wiring diagram of the control circuit for the device.

The device of our invention includes a restraint means, such as one or more easily detachable belts or straps, adapted to be secured to the seat of the vehicle so as to hold a passenger in the seat, and typically comprises, when the device is to be used in automobiles, a single strap passing across the chest of the passenger, and attached to the sides or back of the seat. The device may be provided on both the front and rear seats of the vehicle. For use in aircraft, the device may include a shoulder harness, for more positive restraint against movement in various directions, and may include straps or belts passing generally over the thighs of the passenger from the seat bottom, to prevent the passenger from being raised from the seat if the aircraft suddenly loses altitude. The device preferably continually exerts a moderate amount of tension on such belts, maintaining them generally in their desired location, but such tension should be insufficient to interfere with volitional movements of the passenger, so that the passenger is readily enabled to lean forward or otherwise adjust his position in the seat when he so desires. We further provide a means, responsive to deceleration of the vehicle, for imposing a positive arrest upon the restraining device, so that immediately upon the occurrence of a sudden deceleration, the restraining device becomes firmly fixed, and maintains the passenger securely in place so that he cannot be thrown from his seat and injured. Such means may include an inertia-operated switch and/or a switch associated with the brake pedal, or the hydraulic braking lines, or the stop-light circuit of the vehicle.

Figure 1:
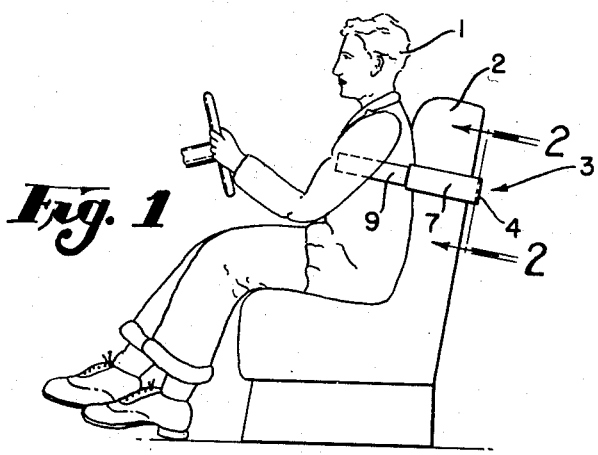
Fig. 1 is a side elevational view showing a driver seated in an automobile equipped with the safety device of the invention.
Figure 3:
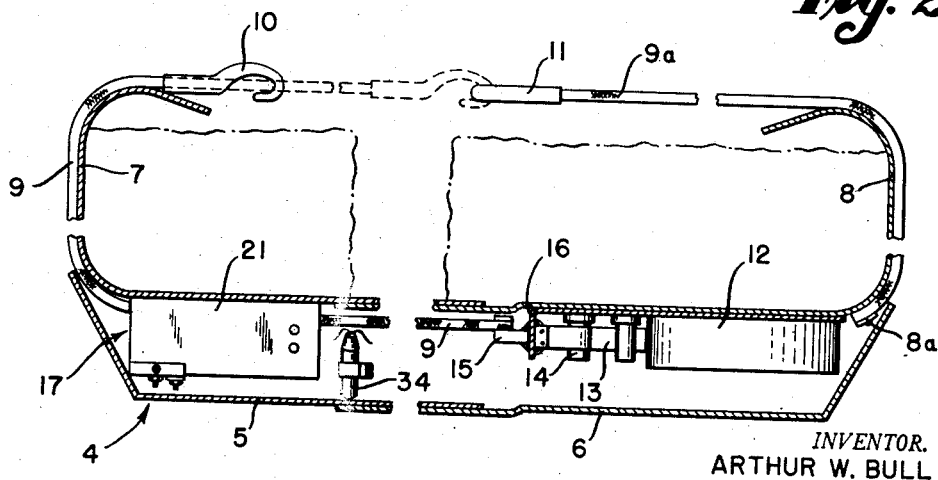
Fig. 3 is a plan view of the device, with parts in section and parts broken away, taken along line 3—3 of Fig. 2.

Referring to the drawings, and in particular to Fig. 1, there is shown a driver 1 seated in an automobile seat 2. A safety device 3 constructed according to the invention is fastened in any suitable manner to the back of the seat near the upper portion thereof. The safety device includes a longitudinal enclosing casing 4, made, as best seen in Fig. 3, of two telescoping sections 5 and 6 to permit adjustment of the size of the casing in accordance with the width of the seat. Side extensions 7 and 8 of the casing pass forwardly around the sides of the seat in closely fitted relationship therewith. A safety belt 9 extends from one end of the casing and along one side portion 7, and may be passed over the chest of the passengers in the seat. One end of the belt 9 is attached, by means of a hook 10 on the end of the belt, to an eye 11 on the end of a second belt member 9a extending from the opposite side of the casing and fastened thereto by means of a rivet 8a or other suitable means.

An enclosed tensioned reel 12 mounted within the casing 4 toward one end thereof contains a strip 13 which passes from the reel and across guide pins 14 mounted within the casing, and is secured to the end of the safety belt 9 by a suitable attachment 15. The reel 12 exerts a moderate tension on the belt 9 and tends to withdraw it into the casing and maintain it properly in place. A fixed vertical stop 16, projecting from the wall of the casings, serves to limit the return of the belt to the desired point. The tension exerted on the belt 9 by the reel 12 is only moderate, so that the passengers are ordinarily free to lean forward or move about in the seat if they so desire, and they are not normally placed under any uncomfortable restraint.

The belt 9 also passes through an inner channel or U-bracket arrangement 17 mounted within the outer casing 4 on the forward wall thereof, in which there is contained an arresting device responsive to sudden deceleration of the automobile. A vertically disposed brake member 18 is pivotally supported for horizontal movement about upper and lower vertical mounting pins 19, 20, secured in the upper and lower horizontally extending portions 21, 22 of the bracket 17. The forward vertical surface 23 of the brake is curved, and is provided with an anti-friction lining material, such as rubber, to more effectively arrest movement of the belt 9 when the brake is in operative engagement therewith, as shown in Fig. 5. The brake extends from its pivotal mounting toward the belt in a slanting direction opposite to the direction of movement of the belt when an outward stress is imposed on the belt, as indicated by the arrow in Figs. 4 and 5.

To actuate the brake 18, there is provided a horizontally extending electromagnetic coil 24, mounted on a rearward side extension 25 of the bracket 17. For this purpose, an angular plate 26 is secured to the brake 18 by welding or other suitable means. The plate 26 has a portion 27 disposed opposite to the electromagnetic coil 24. The arrangement is such that energizing of the electromagnetic coil 24 causes the plate portion 27 to be drawn toward the coil, thereby rotating the brake 18 about its pivotal mountings 19 and 20, and bringing the brake surface 23 into firm engagement with the surface of the belt 9, as depicted in Fig. 5.

To return the brake 18 to its inoperative position when the coil 24 is not energized, the end of another portion 28 of the angular plate 26 extends, at its upper and lower edges, as best seen in Fig. 6, between closely spaced pairs of positioning angle brackets 29, 30, 31 and 32, fastened to the upper and lower portions 21 and 22 of the bracket 17 by means of rivets 33. The inner brackets 29, 31 have a leaf spring action such that they are forcibly deflected, as shown in Fig. 5, by pivotal movement of the angular plate 27 when the brake is energized, and such spring action serves to return the angular plate 26 to inoperative position against the outer positioning brackets 30, 32 when the brake is denergized, as shown in Figs. 4 and 6.

Provision is made for automatic energizing of the coil 24 at the instant of unusually rapid deceleration of the automobile. Such provision includes an inclined normally open mercury switch 34 mounted on an adjusting bracket 35 within the casing 4 in such manner that deceleration of the vehicle will cause the pool of mercury 36 in the switch to surge forward of its own inertia, thereby closing the electrical circuit illustrated in the elementary wiring diagram, Fig. 9. The angle of the switch 34 to the horizontal may be adjusted about the pivotal bracket 35, by means of set screws 37, 38 (Fig. 6) extending downwardly through the upper wall of the casing 4 into contact with the upper surface of the switch. The angular disposition of the switch determines how rapid a deceleration is necessary to actuate the switch. A battery 39 supplies energy for the device through conductors 40 and 41. The conductor 40 leads to a conductor 42 connected to the switch 34, whence a conductor 43 leads to a normally closed push button switch 44, and thence through a conductor 45 to one terminal 46 of the control coil 24. The push button 44 may be used to deenergize the system in case of mechanical failure of the vehicle, or in the event that the vehicle is in such a position that the switch 34 is energized.

In operation, a sudden deceleration of the automobile, as in a collision or in an emergency stop, will cause the mercury switch 34 to close, and the control coil 24 is thereby immediately energized from the battery 39 through conductors 40, 42, 43 and 45, and the conductor 41 leading to the remaining terminal 47 of the coil. This, in turn, causes the portion 27 of the angular plate 26 to be drawn toward the coil 24, with consequent rotation of the brake 18, so that the rubber face 23 thereof contacts the surface of the belt 9. Further outward movement of the belt is thereby immediately forcibly halted by a jamming action exerted by the brake 18. It will be noted that the radial length of the brake measured from the center of its pivotal mounting 19, 20 to its frictional surface 23, is greater than the perpendicular distance between the pivotal center and the surface of the belt, to provide for the desired jamming action of the brake. Outward tension on the belt causes the belt to exert a tangential force on the brake that tends to cause further rotation of the brake with the result that the belt is more firmly wedged in between the surface of the brake and the face of the bracket 17. This insures that the belt will hold even a heavy passenger securely in the seat against the inertial forces resulting from rapid deceleration. This action is continued until the tension exerted on the belt by the passenger is released.

There is also provided in the electrical circuit a switch 48 connected to the conductor 40 and arranged in electrical parallel to the inertia-operated mercury switch 34 by means of a conductor 49. The switch 48 is actuated by a suitable linkage 50 connected to the brake pedal 51 of the automobile in such manner that depression of the brake pedal will close the switch 48, thereby energizing the control circuit, and restraining the belt 9 against movement to keep the passengers in place in their seats in the same manner as previously described.

In the modification of the invention shown in Fig. 8, a brake for arresting the motion of the belt 9 takes the form of a lever 57 having two arms 58 and 59 which are curved at their outer extremities. The arm 59 intended to contact the belt 9 has a face of friction material 60 on its curved portion. The lever is pivotally mounted at 61 to one end of a horizontally extending arm 62, that is pivotally mounted at its other end on a fixed bracket 63. A control coil 64, which may be energized upon occurrence of an emergency in the same manner as described above in connection with the coil 24, serves to attract the metallic arm 62 thereby moving the brake lever 57 toward the belt 9, and contacting the face 60 of the brake with the surface of the belt. The lever 57 is inclined toward the belt in a direction opposite to the withdrawal direction of the belt, and the movement of the belt tends to swing the lever 57 in a clockwise direction as viewed in Fig. 8, thereby jamming the opposite arm 58 of the lever against a fixed portion 65 of the mounting, and thus increasing the pressure of the brake face 60 against the belt 9. The forward arm 59 of the brake lever is somewhat longer and heavier than the rearward arm 58, so that this swinging motion is aided by inertia. Outward tension on the belt causes the belt to exert a tangential force on the brake lever 57, and the resulting tendency to further rotation of the brake increases the jamming or wedging action, which is made possible because the brake lever 57 is longer than the perpendicular distance between the fixed portion 65 and the surface of the belt. A compression spring 66 interposed between the arm 62 and the fixed mounting of the device at an intermediate point serves to prevent accidental forward movement of the arm 62 by inertia, and such spring also serves to return the arm against a rearwardly disposed fixed stop 67 when the control coil 64 is not energized. A suitable screw adjustment 68 connected between the arm 62 and the coil spring 66 permits regulation of the force exerted by the spring.

Figure 7:
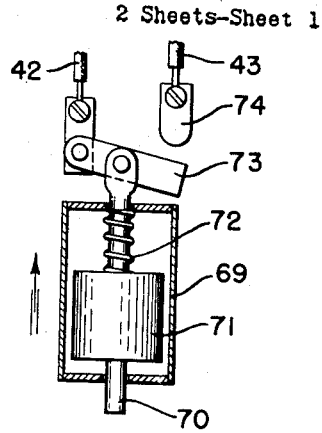
Figure 2:
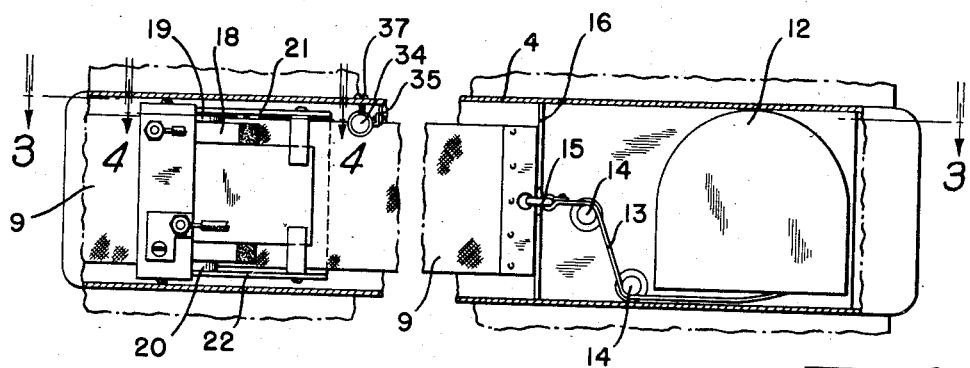
Fig. 2 is an enlarged rear elevational view, taken along line 2—2 of Fig. 1, of a portion of the device, with parts in section and parts broken away.

Fig. 7 shows a modified form of inertia-actuated switch which may be employed in place of the mercury switch 34. This modification includes a fixed housing 69 in which a switch push rod 70 is slidably mounted. A weight 71 is attached to the rod within the housing, to increase its inertia. The direction of travel of the vehicle is as indicated by the arrow, and when a sudden deceleration occurs, the weighted push rod moves in this direction, with respect to the housing, against the pressure exerted by a compression spring 72 disposed between the housing and the weight. The push rod is pivotally attached to a pivotal arm 73 which thereby moves forward into electrical contact with a contact 74, thereby completing the control circuit through conductors 42 and 43.

From the foregoing it will be evident that the invention provides an improved safety mechanism that is instantly responsive to the occurrence of an emergency, whether such emergency be an unusually sudden intentional stop induced by application of the foot brake, or a stop incident to an actual collision. At such times the passengers are safely and positively retained against their seats by the automatic braking or arresting mechanism. However, the passengers are under no undue restraint or discomfort at other times, so that the safety device does not interfere appreciably with free movement and enjoyment of the passengers.

Having thus described our invention, what we claim and desire to protect by Letters Patent is:

1. A safety device for preventing passengers in a vehicle from being thrown from their seats by inertial forces, comprising, in combination, a supporting member adapted to be mounted on a vehicle, a safety belt passing from said member and adapted to be passed across the body of a passenger and fastened to the vehicle, a brake mounted on said supporting member in proximity to the belt, an electromagnetic coil for moving said brake into contact with said belt, and a normally open mercury switch mounted at an angle to the normal direction of travel of the vehicle for closing an electrical circuit through said coil upon deceleration of the vehicle to actuate said brake.

2. A safety device for preventing passengers in an automobile having a brake pedal from being thrown from their seats upon sudden deceleration of the automobile, comprising, in combination, a casing adapted to be mounted across the back of an automobile seat, a safety belt contained partly within the casing, and extending out of one end of the casing, and adapted to be passed across the bodies of passengers in the said seat and detachably secured to the opposite end of the casing, a spring reel mounted within said casing and attached to the safety belt for exerting a moderate withdrawing tension on the belt, a pivotally mounted arresting brake member mounted within said casing in proximity to the face of the belt, an electromagnetic coil connected to an electrical energizing circuit for moving said arresting brake into contact with the face of the belt, and an electrical switch in the said circuit operatively connected to the said automobile brake pedal and adapted to be closed by depression of said brake pedal to complete said electrical circuit through said coil.

3. A safety device for preventing passengers in an automobile from being thrown from their seats upon sudden deceleration of the automobile, comprising, in combination, a casing adapted to be mounted across the back of an automobile seat, a safety belt contained partly within the casing, and extending out of one end of the casing, and adapted to be passed across the bodies of passengers in the said seat and detachably secured to the opposite end of the casing, a spring reel mounted within said casing and attached to the safety belt for exerting a moderate withdrawing tension on the belt, a pivotally mounted arresting brake member mounted within said casing in proximity to the face of the belt, an electromagnetic coil for moving said arresting brake into contact with the face of the belt, a mercury switch mounted at an angle to the normal direction of travel of the vehicle for closing an electrical circuit through said coil to actuate said brake, and a further electrical switch connected in parallel to said mercury switch and adapted to be closed by depression of a brake pedal of the automobile, for closing said electrical circuit.

4. A safety device for preventing passengers in a vehicle from being thrown from their seats by inertial forces, comprising, in combination, a support, a safety belt, one end of said belt being mounted on the support for normally relatively free outward movement and the other end of said belt being adapted to be passed across the body of a passenger and fastened to the vehicle, said support being provided with a bracket having a fixed surface, said belt passing across said fixed surface, a brake member having a friction facing at one end and a pivotal attachment to the said bracket at the other end, the end of the brake carrying the said friction face extending toward the belt in a direction opposite to the direction of outward movement of the belt from said support, an angular plate fixed to said brake, an electromagnetic coil disposed opposite to one end of said angular plate for attracting said angular plate and thereby rotating the brake about its pivotal attachment to cause the friction facing of the brake to engage the belt, the radial length of the brake from its pivotal mounting to its friction face being greater than the perpendicular distance between the said pivotal attachment and the face of the belt, so that further outward movement of the belt exerts a tangential force on the brake and causes the brake to jam the belt firmly against the fixed surface of said braket, a mercury switch mounted at an angle to the normal direction of travel of the vehicle for closing an electrical circuit to energize said coil upon deceleration of the vehicle, a spring engaging one end of said angular plate for maintaining the brake in an inoperative position when the coil is not energized, and a further electrical switch connected in parallel to said mercury switch and adapted to be closed by depression of a brake pedal of the vehicle for closing said electrical circuit.

References Cited in the file of this patent

UNITED STATES PATENTS

| Number | Name | Date |
|---|---|---|
| 1,309,377 | Underhill | July 8, 1919 |
| 2,142,551 | Athy | Jan. 3, 1939 |
| 2,155,758 | Hinde | Apr. 25, 1939 |
| 2,192,262 | Griesedieck | Mar. 5, 1940 |
| 2,403,653 | Geohegan et al. | July 6, 1946 |
| 2,568,431 | Congdon | Sept. 18, 1951 |